United States Patent [19]

LaBarber

[11] 3,975,796

[45] Aug. 24, 1976

[54] SYSTEM FOR DRESSING POULTRY, ANIMALS AND THE LIKE

[75] Inventor: Joseph A. LaBarber, Kern City, Calif.

[73] Assignee: Nebraska Technical Equipment Company, Aurora, Nebr.

[22] Filed: June 11, 1973

[21] Appl. No.: 367,354

Related U.S. Application Data

[63] Continuation-in-part of Ser. No. 351,906, April 17, 1973, Pat. No. 3,921,255, which is a continuation-in-part of Ser. No. 265,953, June 23, 1972, Pat. No. 3,786,535.

[52] U.S. Cl. ................................................. 17/45
[51] Int. Cl.² ........................................ A22C 21/06
[58] Field of Search ............... 17/11, 66, 67, 69, 45, 17/51, 52; 83/168, 169

[56] References Cited
UNITED STATES PATENTS

| | | | |
|---|---|---|---|
| 1,484,618 | 2/1924 | Blades | 17/21 |
| 1,642,802 | 9/1927 | Barry | 17/67 |
| 2,795,815 | 6/1957 | Dahlberg | 17/11 |
| 2,884,658 | 5/1959 | Johnson | 17/67 |
| 3,116,513 | 1/1964 | Ine | 17/11 |
| 3,526,018 | 9/1970 | Lovitt | 17/11 |
| 3,634,908 | 1/1972 | Chamberlain | 17/11 |

*Primary Examiner*—Richard C. Pinkham
*Assistant Examiner*—Arnold W. Kramer
*Attorney, Agent, or Firm*—Neil F. Markva

[57] ABSTRACT

A dressing tool includes a rotatable tubular cutting member with an elongated probe member coaxially disposed therein. The probe member extends outwardly beyond the cutting member. The elongated probe is inserted into the anus of the poultry and a vacuum is drawn in the space between the probe and the cutting member. The cutting member is rotated to produce a circular cut around the anus and the tool is then pulled away from the carcass thereby removing the vent and alimentary canal a desired distance away from the carcass. The trigger of the tool is then released causing an air blow to occur between the probe and cutting member. In timed sequence, a wash cycle begins including a blowing period which is used to eliminate excess liquid from the probe and cutting member. Another feature of the invention is the use of a vacuum draw limiting member disposed on the probe for limiting the distance the vent is pulled into the cutting chamber between the probe and the cutting member.

15 Claims, 13 Drawing Figures

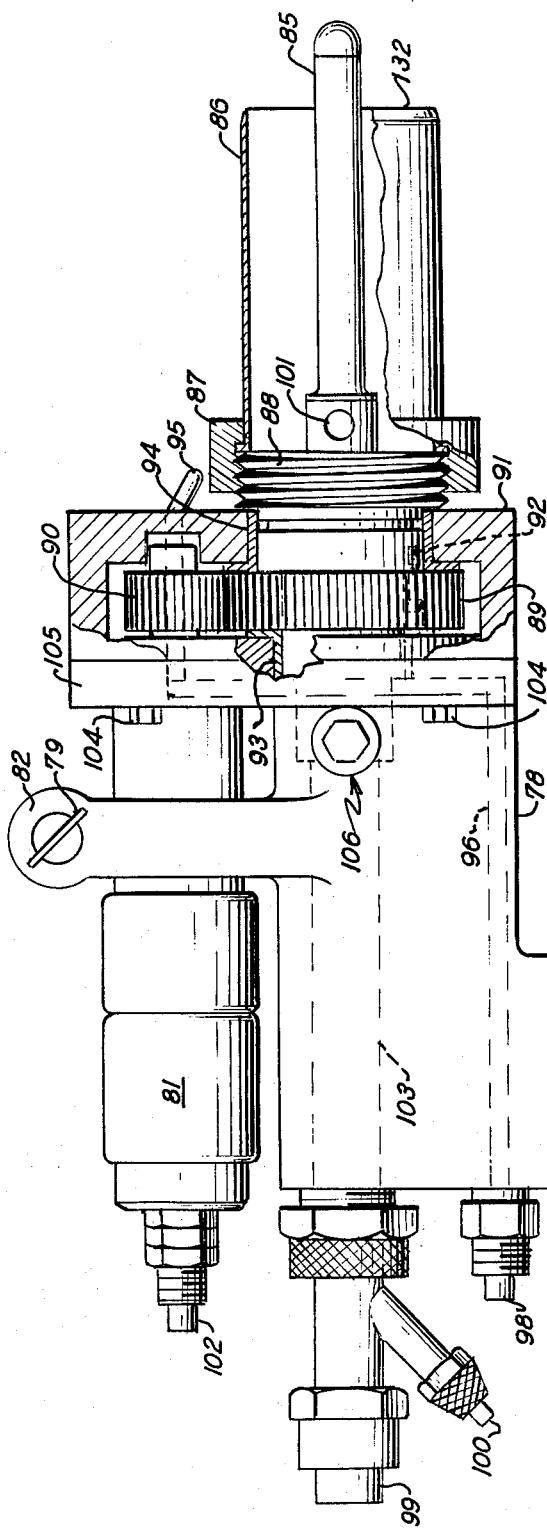
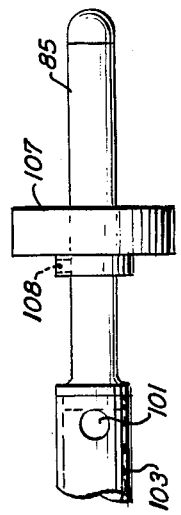
FIG. 7
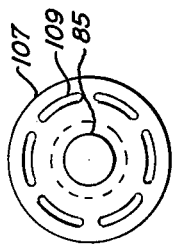
FIG. 8
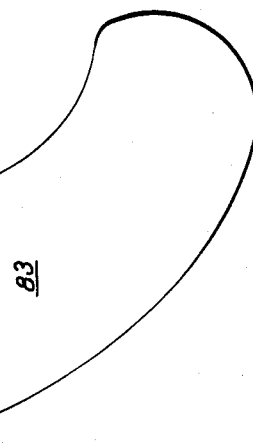
FIG. 4

SYSTEM FOR DRESSING POULTRY, ANIMALS AND THE LIKE

RELATED APPLICATIONS

This is a continuation-in-part of application Ser. No. 351,906 filed Apr. 17, 1973, and now U.S. Pat. No. 3,921,255, which is a continuation-in-part of parent application Ser. No. 265,953 filed June 23, 1972, and now U.S. Pat. No. 3,786,535.

BACKGROUND OF THE INVENTION

Dressing tools operating under compressed air and vacuum lines are very well known in the prior art. Such prior art dressing tools which are hand held are disclosed in U.S. Pat. Nos. 2,590,785, 3,147,513 and 3,526,018. These prior art dressing tools or eviscerators generally use a rotatable cutting member in combination with a vacuum drawing mechanism to cut the area around the anus and pull the entrails from the poultry being cleaned. The main problem associated with the latter two patented devices is that the main intestine is not supported during the cutting operation. There is an extreme danger that the main intestine itself may be severed and the poultry consequently contaminated during the cutting operation.

The poultry dressing tool as disclosed in U.S. Pat. No. 2,590,785 uses a solid threaded probe which is inserted into the external opening of the main intestine and acts only as a guide for the rotating cutter. In that particular prior art device, the pilot or guide rotates as it enters the vent to provide support for the portion of the fowl to be removed.

In all of these prior art devices, the dressing or cleaning operation and the sequence associated with the operation of the dressing tools is left completely to the operating personnel. The cleaning operation, therefore, is only as fast as the particular operating personnel happens to be. In addition, there is no insurance that the poultry being cleaned with these devices will remain uncontaminated due to misplacement of the rotating cutting device or a lack of removal of any waste material present in the main intestine.

PURPOSE OF THE INVENTION

The primary object of this invention is to provide a dressing tool or eviscerator for poultry and the like wherein the cleaning operation may be effectuated under totally non-contaminating conditions.

Another object of this invention is to provide a hand held dressing tool for poultry and the like which will enable rapid and efficient cleaning of the poultry in a manner that is not completely a function of the particular operating personnel.

A still further object of this invention is to provide a completely automated, program controlled dressing tool for poultry, animals, and the like.

A still further object of this invention is to provide an eviscerator for poultry, animals, and the like wherein the portion of the main intestine adjacent the vent is first evacuated before any cutting is effectuated around the vent.

Another object of the invention is to provide a hand held eviscerator for poultry, animals, and the like which will pull the anus and the entrails outwardly from the fowl for a distance sufficient to allow the grasping thereof for subsequent removal operations.

A still further object of this invention is to provide an eviscerator that is easily handled during the cutting operation and may be thoroughly cleaned automatically as a part of a controlled program by flushing the probe and cutting member with fluid.

Another object of the invention is to provide an air logistics system and a fluidic control system for operating all of the functions of the dressing tool automatically in response to the depression and release of a trigger.

A further object of the invention is to provide nozzles which will direct a flow of cleaning liquid such as water around the outside of the cutting member and probe while the inside of the cutting member is also being flushed with cleaning liquid.

A further object of this invention is to provide a vacuum draw limiting member on the probe at a location within the cutting chamber to limit the distance the vent travels once it is cut free from the carcass of the poultry or other animal.

SUMMARY OF THE INVENTION

The dressing tool or eviscerator as described herein includes a rotatable cutting means with a probe member coaxially disposed therewith. The elongated probe member is hollow and extends outwardly beyond the cutting means. Means are provided for drawing a vacuum through the elongated probe means after it has been inserted through the external opening of the main intestine for the purpose of removing any waste material lodged therein. Means are provided for pulling a vacuum within the space between the probe member and the rotatable cutting means after the cutting member has been placed against the area surrounding the vent of the poultry. Once the poultry has been cut, the device is pulled away from the poultry thereby carrying with it the alimentary canal along with the fistula without causing any contamination.

Another feature of this invention is directed to the specific automated control of the eviscerator. The entire operation is initiated by depressing a single trigger which actuates the programmed control means to effectuate the automatic sequence of operations.

Another embodiment of the invention is directed to the use of a probe member disposed within a rotatable cutting member wherein wash nozzles are disposed around the outer periphery of the cutting member to flush the probe and cutting member with cleaning fluid such as water. A vacuum draw limiting member is mounted on the probe member to limit the distance the vent is drawn once it is cut free from the carcass. The limiting member includes openings to allow the vacuum to be drawn there-through. The openings in the limiting member also allow the air to blow into the chamber to eject the vent material after it has been pulled away from the carcass by the operator.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 4 is a fragmentary sectional side view of another embodiment of a dressing tool made in accordance with this invention, FIG. 7 is a side elevational view of a probe member showing another feature of the invention, FIG. 8 is a front elevational view of the probe member of FIG. 7, FIGS. 9 and 10 are schematic diagrams showing programmed control mechanisms for systems made in accordance with this invention.

DESCRIPTION OF SPECIFIC EMBODIMENTS

Figure 1:
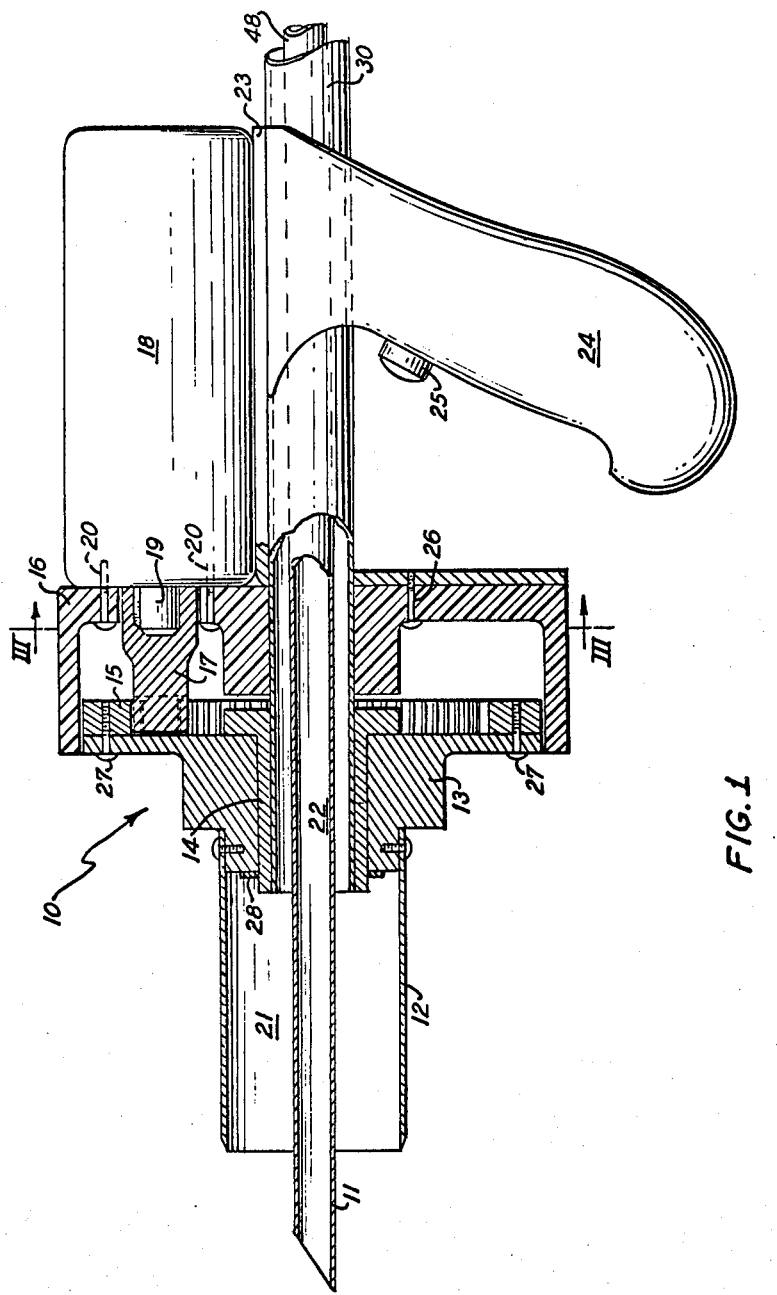
FIG. 1 is a longitudinal sectional view of a dressing tool made in accordance with this invention.
Figure 2:
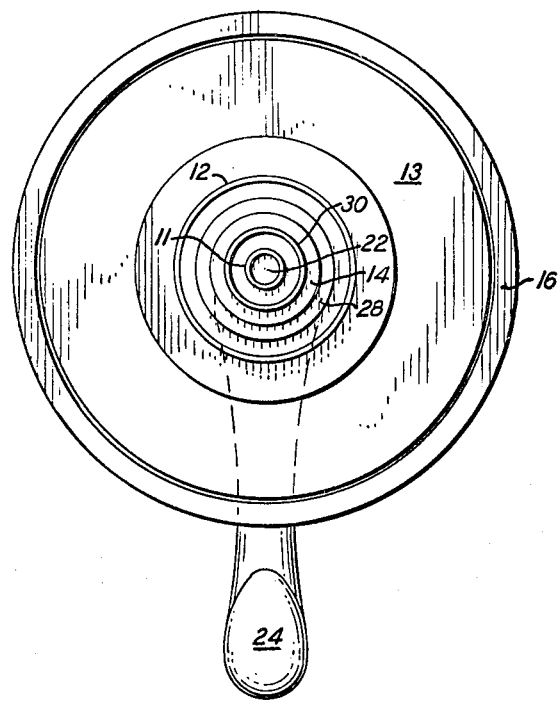
FIG. 2 is a front end elevational view of the device shown in FIG. 1.
Figure 3:
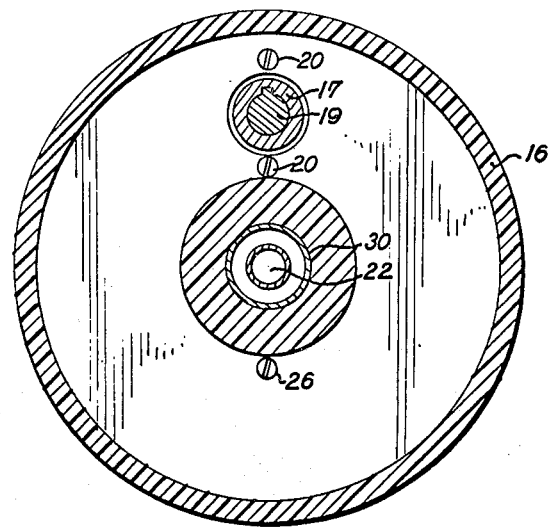
FIG. 3 is a cross-sectional view along line III—III of FIG. 1.

More specifically, a dressing tool, generally designated 10, includes a hollow probe 11 coaxially disposed within a rotatable cutter member 12. The probe 11 extends outwardly beyond the cutting edge of the cutting member 12. The cutting member 12 is mounted on the rotatable mandrel 13 which is mounted on the bushing 14 and held in place by way of the snap ring retainer 28. The bushing 14 is slidably mounted on the hollow tubing 30 so that the entire mandrel rotates around the central axis of the tubing 30 and the probe member 11. The probe is shaped at its end in a suitable manner to facilitate easy insertion thereof into the vent of the fowl. The cutter member 12 may be composed of any desired material which is extremely hard and will hold its cutting edge over an extended period of time. It has been found that stainless steel or hardened tool steel may be used to effectuate the desired results. Various sizes of cutter member 12 may be interchanged very rapidly to accommodate different sized poultry. Any desired connecting means may be used to removably attach the cutter member 12 to the mandrel 13.

An air driven motor 18 is mounted on base bracket 23. The motor shaft 19 extends through an opening in the housing 16 and carries the pinion gear 17 which is in operative contact with the inside gear ring 15. Screws 27 fixedly attach the gear ring 15 to the mandrel 13. Actuation of the motor 18 therefore will rotate the cutter member 12 about its axis of rotation which is coaxially disposed with respect to the fixedly mounted probe member 11.

The handle member 24 is also attached to the base bracket 23 and includes the trigger 25 which may be depressed to activate the dressing tool. The housing 16 is composed of a plastic material in this specific embodiment. A plastic material such as Lexan, produced by General Electric Co., is substantially unbreakable when used in such an application. Screws 26 are used to hold the housing 16 onto the base member 23.

The handle 24 is shaped in such a manner as to allow the operator to hold the tool 10 at an angle which will facilitate the rapid and accurate placement of the probe 11 into the vent. The handle extends in a direction toward the front of the tool 10 at an angle of greater than 45° and less than 90° with respect to the longitudinal axis of the tool. The desired angle will correspond to the angle at which the poultry is disposed on the moving processing line located in front of the operating personnel.

It is important that all the materials used in this particular apparatus be in accordance with U.S. Department of Agriculture regulations inasmuch as there are no toxic materials to be in contact or near the food product being processed. The apparatus 10 is operated completely through the use of compressed air and vacuum lines thereby eliminating all necessity for the use of electricity in the area of operation. The use of this particular device 10 also eliminates the necessity for the operating personnel to insert a finger into the vent and make the necessary cuts for removal of the alimentary canal.

Figure 9:
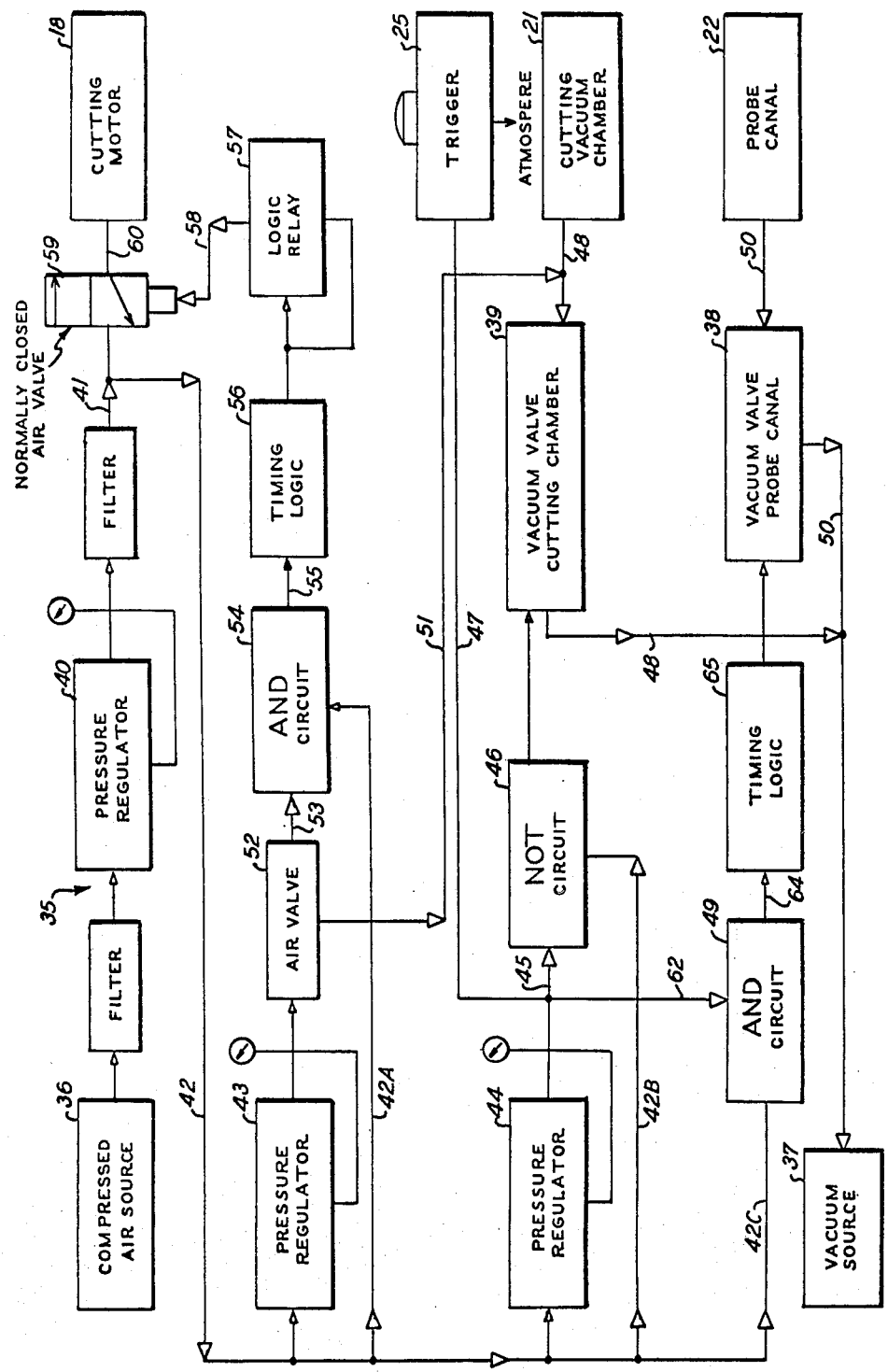

Another feature of this invention is directed to the control mechanism, generally designated 35, and shown schematically in FIG. 9. To operate the dressing tool 10, it is necessary to have a compressed air source 36 and a vacuum source 37. The normal compressed air line is rated at about 80 to 90 p.s.i. and the vacuum lines are rated at about 20 inches to 25 inches. These particular sources may be already installed in a poultry dressing plant. However, it is possible that the use of a portable compressed air system or a portable vacuum producing system may be incorporated into the control mechanism. This would facilitate the use of the system made in accordance with this invention in any conceivable operation.

The probe canal 22 and the hollow tubing 30 each form vacuum channels and are in operable connection with the vacuum source 37. In this specific embodiment, once the system is turned on, a vacuum is drawn through the probe canal 22. Therefore, when the probe 11 is inserted into the vent, any material present in the main intestine is immediately removed therefrom and deposited in a refuse container of any desired kind (not shown). Such refuse containers are readily available in the prior art and are commonly used in conjunction with vacuum lines generally.

Once the probe member 11 has been inserted fully into the main intestine, the trigger 25 is depressed and the vacuum source 37 is operatively connected to the hollow tubing 30. This hollow tubing 30 opens up into the cutter chamber 21 defined by the space between the inner surface of the annular cutter member 12 and the outer surface of the probe member 11. When the vacuum is drawn on the hollow tubing 30, the anus is drawn into the cutting chamber 21. After a measured, pre-determined time interval, the motor 18 is activated to rotate the cutting member knife 12.

After cutting, the anus and alimentary canal are pulled out a sufficient distance to be grasped for subsequent cutting and cleaning operations and the trigger 25 is released. Consequently, the vacuum canals 22 and 30 are open to the atmosphere. The vacuum source 37 remains disconnected from either the probe canal 22 or the hollow tubing 30 for a measured, predetermined time interval to allow the entrails to be removed from the eviscerator 10. After the time interval has elapsed, the probe canal 22 is automatically once again operatively connected to the vacuum source 37 and the tool 10 is in a ready position for insertion into the next poultry carcass.

In order to effectuate the above described sequential operation, the control mechanism 35 as shown in FIG. 9 may be used. The control mechanism includes a vacuum valve 38 which is located between the probe canal 22 and main vacuum source 37. The vacuum valve 38 is normally open and allows the vacuum to draw on the probe canal 22 at the time the system is initially started. A vacuum valve 39 is disposed between the cutter vacuum chamber 21 and the vacuum source 37. The vacuum valves 38 and 39 are operated by compressed air at about 1 p.s.i. A first pressure regulator 40 is disposed after the compressed air source 36 and reduces the air pressure to from about 40 to 60 p.s.i. for the balance of the system.

As is evident from the drawings, the programmed control mechanism has valves 38 and 39 disposed at a location away from the dressing tool 10. That is, valves of the control mechanism are disposed at a location between the dressing tools 10 and 80 and the compressed air and vacuum sources for controlling the flow of compressed air and vacuum during a working cycle of the dressing tools.

Line 42 directs compressed air into the pressure regulators 43 and 44 where the line pressure is reduced to about 1 p.s.i. The NOT logic circuit 46 maintains the vacuum valve 39 in a normally closed condition as long as a pressure of 1 p.s.i. is present at the input port 45. Upon depression of the trigger 25 the 1 p.s.i. pressure of air at the input port 45 is bled off into the atmosphere through line 47. Consequently, NOT circuit 46 into which supply line 42B is directed now produces an output signal activating vacuum valve 39 thereby connecting cutting chamber 21 to vacuum source 37 by way of line 48. It is at this time that the anus is held tightly against the vacuum chamber 21.

The vacuum on line 48 will produce a vacuum on the valve actuating line 51 thereby causing air valve 52 to be energized. Once air valve 52 is actuated, an impulse is produced at port 53 of the AND logic amplifier 54 which is connected to line 42 by way of line 42A. Once input impulses are present at both the input of line 42A and input port 53, a pressure impulse is produced at output 55 to activate the timing logic circuit 56. The timing logic circuit 56 delays the activating of cutting motor 18 for an amount of time sufficient to allow the anus to be adequately pulled into the cutting chamber 21.

After a predetermined time interval, an impulse is released from the timing logic circuit 56 and fed into the air logic relay 57. An air time signal is then sent over line 58 to open the normally closed air valve 59. Upon opening of the air valve 59, air is released on line 60 to actuate the cutting motor 18 thereby rotating the cutting member 12. Through the use of this circuitry, it is possible to carefully control both the speed and the number of revolutions per minute that the cutter member 12 will turn while it is drawn into contact with the area around the anus.

The cutter member 12 will stop rotating automatically at the end of a predetermined time interval controlled at the logic relay circuitry 57. All of the logic devices used in the control mechanism 35 are old and well known and may be obtained commercially.

Once the cutting member 12 has stopped rotating, the operator extracts the anus and alimentary canal from the poultry carcass. Once the extraction has been effected, trigger 25 is released thereby causing a 1 p.s.i. buildup at port 45 of the NOT logic circuit 46 and input port 62 of an AND circuit 49. Activation of the NOT circuit 46 eliminates the signal impulse to vacuum valve 39 and the vacuum is thus disconnected from line 48 and the cutting vacuum chamber 21. At this point in the operation, the anus and the alimentary canal are released from the vacuum chamber 21.

Additionally, after trigger 25 is released, the 1 p.s.i. pressure is also present at the input port 62 of the AND logic circuit 49 which is also in contact with the line 42 via line 42C. The resulting signal impulse on output 64 is sent into the timing logic circuit 65. Consequently there is a delay of a predetermined time interval before a signal impulse reopens vacuum valve 38.

It is during this time interval when the vacuum is off both the cutter chamber 21 and the probe canal 22 that the anus and alimentary canal are released from the end of the dressing tool 10. Once the valve 38 is again automatically opened, the line 50 is again openly connected to the vacuum source 37 to draw a vacuum through the probe canal 22 and the dressing tool 10 is then ready for the operation to be repeated on the next poultry carcass.

The trigger 25 is depressed only after probe 11 has been inserted into the vent of the next carcass. Consequently, the line 47 is opened to the atmosphere and bleeds the 1 p.s.i. pressure off the input port 45 of the NOT circuit 46 and the input port 62 of the AND circuit 49. Therefore, the vacuum valve 39 is opened and the cutting vacuum chamber 21 is connected to vacuum source 37 and at substantially the same time, the vacuum valve 38 is closed thereby disconnecting the probe canal 22 from the vacuum source 37.

Another feature of this invention is directed to the use of an automatic wash cycle which is activated during the time that the vacuum source 37 remains disconnected from either the probe canal 22 or the hollow tube 30. As discussed hereinabove, the vacuum source 37 may remain disconnected from ducts or canals 22 and 30 for a measured, predetermined time interval to allow the entrails to be removed from the eviscerator 10.

Figure 10:
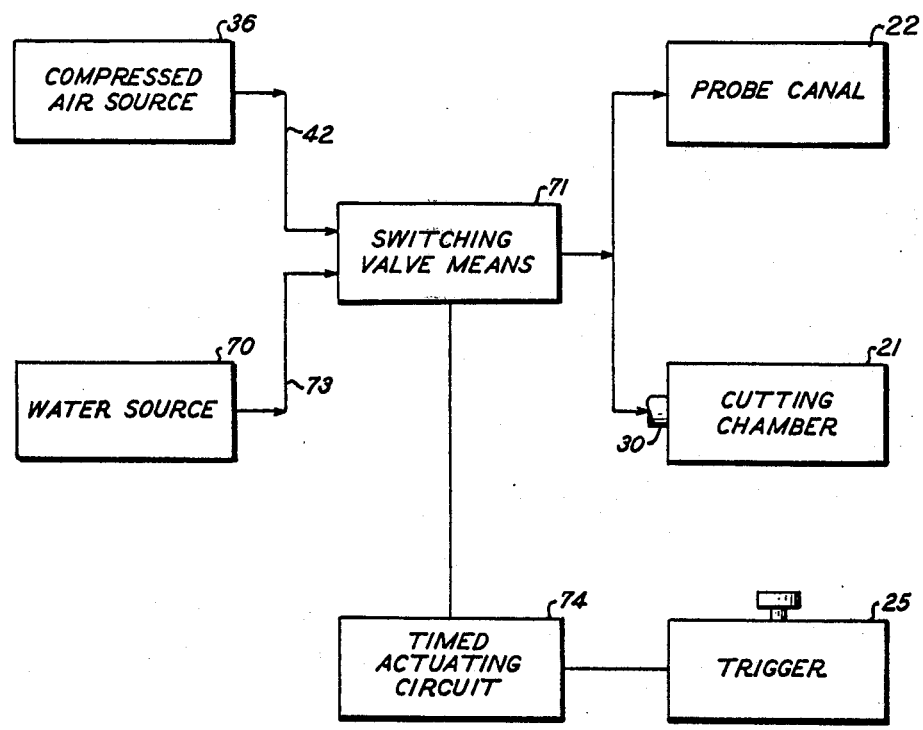

In this feature of the invention, the entrails including the alimentary canal and vent or anus are removed from the eviscerator 10 upon the release of the trigger 25. That is, when trigger 25 is released, the as seen in FIG. 10 compressed air source 36 is opened to the probe canal 22 and cutting chamber 21 via the hollow tubing 30. This initial air blow is followed by a water blow when a flow of water is directed from water source 70 into the probe canal 22 and hollow tubing 30 by the switching valve means 71. After a predetermined time interval, the water blow is stopped and a further air blow is effectuated to remove any water from the probe canal or cutting chamber before the tool 10 is in a ready position for insertion into the next poultry carcass.

The water used in this washing cycle is filtered and may contain disinfectant materials for cleaning and disinfecting the cutting tool 12. Water that is forced through the probe canal 22 and hollow tubing 30 will wash any solid material away from the probe 11 and the cutting member 12. The water will flush out the vacuum chamber 21 and clean off the outer cutting edge of the cutting member 12 and the outer edge of the probe 11. The compressed air may be drawn from line 42 which is connected to the compressed air source as shown in FIG. 10.

A timed actuating circuit 74 may include the necessary timing logic circuitry and/or logic relay circuitry necessary to control the switching valve means 71 for effectuating the desired results as stated hereinabove.

The compressed air source 36 and water source 70 are in a normally closed condition. That is, the time actuating circuit 74 is merely armed or placed in a ready position at the time the trigger 25 is initially depressed. Any desired logic circuitry may be used to effectuate this readying of the actuating circuit 74. It is during this ready position that the vacuum and cutting portion of the cycle as discussed hereinabove is accomplished. That is, vacuum is pulled through the probe canal 22, then through the cutting chamber 21 followed by the operation of the cutter member 21 by the cutting motor 18. After the entrails have been separated and removed from the carcass, trigger 25 is released thereby energizing the actuating circuit 74 from its armed or ready position. The actuating circuit 74 then operates during a predetermined time interval in the manner described hereinabove. As soon as the wash cycle has finished, the probe 22 is automatically once again operatively connected to the vacuum source 37 and the tool 10 is again in a ready position for insertion into the next poultry carcass.

Both the hollow probe canal 22 and hollow tubing 30 are filled with either air or water during the air and water blowing steps, respectively, of the flushing cycle. It is clear that the supply of water may be limited to the hollow tubing 30 thereby washing off both the probe member 11 and the cutting member 21 at the same time. It is possible also that a mixture of air and water might be used to constitute the fluid used during the washing or flushing cycle for cleaning the tool 10 between each cutting operation.

Figure 5:
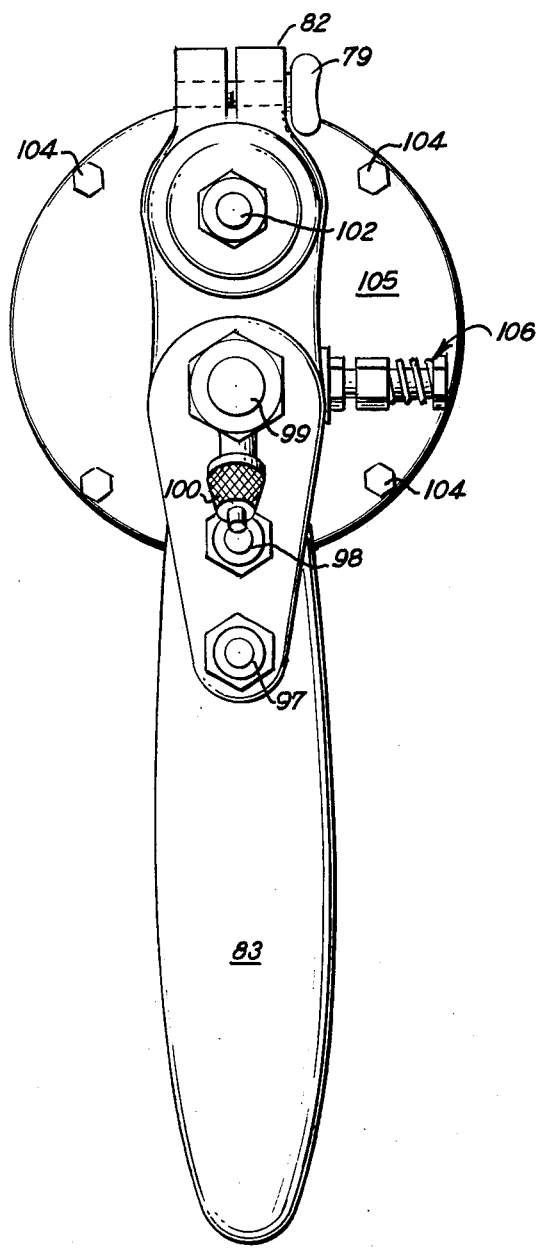
FIG. 5 is a rear elevational view of the device of FIG. 4.
Figure 6:
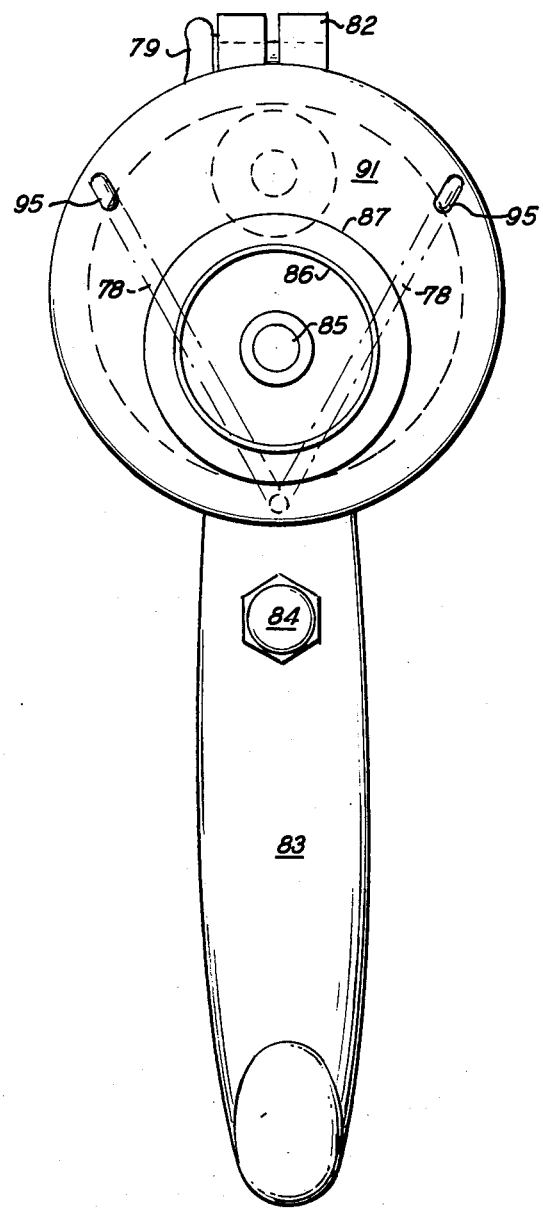
FIG. 6 is a front elevational view of the device of FIG. 4.

The vent cutting tool, generally designated 80, constitutes another embodiment of this invention and is shown in FIGS. 4 through 6. The tool 80 includes an air motor 81 which is removably mounted in the bifurcated portion 82 by the tightening screw 79. The bifurcated portion 82 extends upwardly from a main body section 78 and handle 83 extends downwardly from the bottom portion 78.

A stationary probe 85 is mounted at the end of a removably mounted tube 103 which extends through the main body portion 78. A cutting member 86 is rotatably mounted onto a drive spindle 88. The annular member 87 holds the cutter member 86 in contact with the spindle 88. Spindle 88 is rotatably mounted on the tube 103 and within an opening of the housing 91. Spindle 88 carries a gear member 89 that is fixedly attached thereto by screws 92. Bearings 93 and 94 are used to contact the rotating surfaces. The tube 103 includes an opening at the base of the opening 101 at the probe 85. The opening 101 is in communication with the lines 100 and 99 for alternately providing a flow of water or producing a vacuum within the cutting chamber.

The drive gear 90 is carried by the shaft of the air motor 81 and is in driving contact with the driven gear 89 thereby enabling the spindle 88 to rotate the cutter member 86. The air motor 81 is driven by compressed air directed through line 102.

The housing member 91 is fixedly attached to the flange section 105 by screws 104. A canal or bore 96 extends through the main body portion 78 in two directions through the flange 105 and through the housing 91. Nozzle members 95 are mounted on the outside of the housing 91 at the end of each section of canal 96. The nozzle members 95 are disposed on the housing 91 in a manner to direct a flow of liquid toward the outside of cutting member 86. Line 98 connects canal 96 and the nozzles 95 to a fluid source.

Trigger valve 84 is mounted in the handle 83 to control the pressure in the line 97 for activating the control system associated with the tool of this invention.

Another feature of the invention is shown in FIGS. 7 and 8 and includes a limit member 107 mounted on the probe 85 by the set screw 108. The limit member includes openings 109 which allow for a free flow of fluid to pass therethrough. When a vacuum is drawn in the cutting chamber, the vent is pulled therein against the limiting member 107, thus controlling the depth of cut into the carcass of the animal. The openings 109 then allow an air and water blow to pass therethrough to eject the vent and clean the probe member 85 and the inside of the cutting member 86. The limit member 107 might also be a part of a one-piece construction for the probe member 85. Alternatively, the probe member 85 could be constructed of a plurality of cylindrical sections and the limit member could be placed contiguous to the cylindrical sections of the probe member 85 to provide an integrally formed probe member and limit member.

Figure 11:
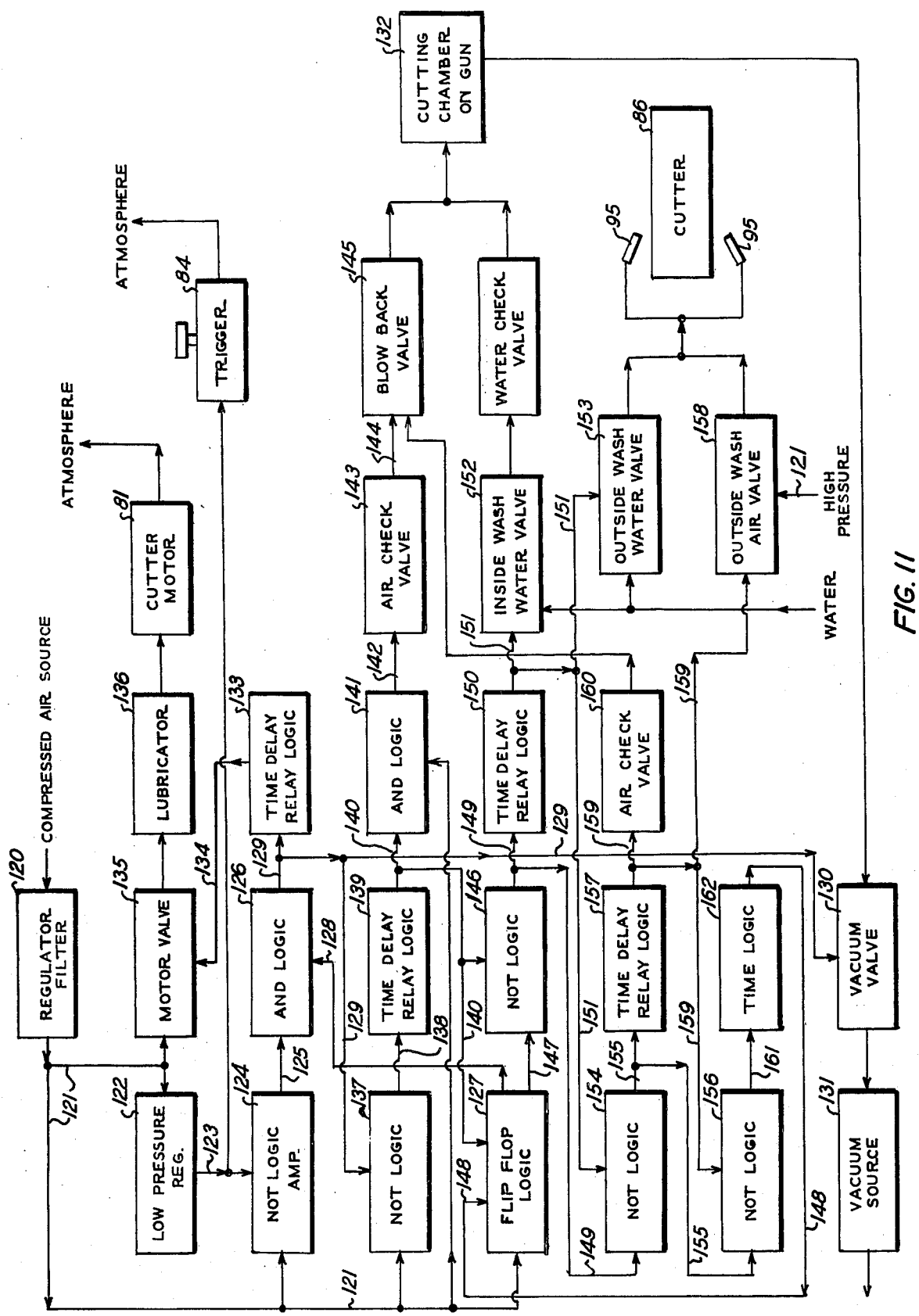
FIG. 11 is a schematic diagram showing an air logistics control system for the embodiment of FIG. 4, and FIGS. 12A and 12B constitute a schematic diagram showing a fluidic control system for the embodiment of FIG. 4.

The control system as shown in FIG. 11 is an air logistics system. High pressure air is directed through the regulator filter 120 and applied to line 121 as a source of compressed air to the various components.

The sequence in the air logistics system or programmer is started when the operator presses the trigger valve 84. The low pressure regulator 122 normally maintains a one pound per square inch pressure signal in line 123 at the control port of the NOT logic amplifier 124. When the trigger valve 84 is depressed, the low pressure signal in line 123 is opened to the atmosphere. Depletion of the one pound per square inch signal in line 123 causes the NOT logic amplifier 124 to direct the high pressure air in line 121 to the line 125, thereby controlling the AND logic circuit 126 which is also receiving a signal from the flip-flop logic element 127 through line 128.

Once the AND logic circuit 126 is activated, air is introduced to line 129 which actuates the vacuum valve 130 so that vacuum source 131 pulls a vacuum within the cutting chamber 132 of the gun between the probe member 85 and the cutting member 86. The establishing of the vacuum within the cutting chamber 132 pulls the vent of the carcass against the cutting edge of the cutting member 86. At the same time the vacuum valve 130 is actuated, the time delay relay logic circuit 133 is also activated. After a predetermined length of time delay, a signal is sent to the motor valve 135 over line 134 thereby allowing high pressure air from line 121 to go through the lubricator 136 for operation of the cutter motor 81. The time delay relay logic 133 is set so that the cutter motor 81 operates only for a predetermined length of time.

After the cutter 86 has been rotated by the cutter motor 81 to cut the vent free of the carcass, the operator pulls the vent and alimentary canal out of and away from the carcass. The trigger 84 is maintained in a depressed condition during the removal operation, thus maintaining the connection between the vacuum source 131 and the cutting chamber 132.

Once the vent and alimentary canal have been removed from the carcass, the trigger valve 84 is released thereby re-establishing the low pressure signal at the control port of the NOT logic amplifier 124. Consequently, the signal on line 129 applied to the NOT logic circuit 137 is removed thus causing a high pressure signal from line 121 to be applied on line 138 for activating the time delay relay logic 139. A signal is established on line 140 for a predetermined amount of time as controlled by the time delay relay logic 139. The signal on line 140 is applied to the AND logic circuit 141 which turns on the blow back valve 145 via line 142, air check valve 143 and line 144. That is, high pressure air is taken from line 121 and directed into the cutting chamber 132 thereby ejecting the vent from the cutting chamber 132.

At the same time the AND logic circuit 141 receives a signal, a signal is also sent to the NOT logic circuit 146 and flip-flop logic 127 via line 140. The signal to the NOT logic circuit 146 puts this circuit in an off position and the flip-flop logic circuit 127 turns off the signal on line 128 going to the AND logic circuit 126 and shifts the air supply to line 147. Now the programmer or air logistics system must complete the rest of the cycle before the operator can begin another cycle by depressing trigger 84. The blowing phase must be completed as stated herein.

Time delay relay logic 139 turns off after a predetermined amount of time, thus depleting the signal on line 140. The flip-flop logic circuit 127 will stay in the same position until it receives another signal on line 148. The depletion of a signal on line 140 also turns on the NOT logic circuit 146 causing a signal to appear on line 149 thus causing activation of the time delay relay logic 150. The signal appears on line 151 for a predetermined amount of time for turning on both the inside wash water valve 152 and the outside wash water valve 153. A short pulse of water is sprayed through nozzles 95 onto the cutter member 86 to effectuate the desired cleaning operation. That is, both the inside and the outside of the cutter member 86 are flushed with the short pulse supply of water.

A signal is also applied to the NOT logic circuit 154 over the line 151 to maintain it in the off position. After the time delay relay logic circuit 150 has timed out, the signal on line 151 is depleted thus removing the signal on the NOT logic circuit 154. Consequently, a signal is applied to line 155 thereby supplying pressure to the NOT logic circuit 156 and time delay relay logic 157. As a further result, blow back valve 145 and outside wash air valve 158 are activated via line 159 which includes air check valve 160. Activation of the blow back valve 145 and wash air valve 158 forces water to the inside and outside of the cutting chamber 132 simultaneously. The water has been left in the lines from the first wash cycle.

As the time delay relay logic 157 times out, the signal is depleted from line 159 thus turning off the air valves 145 and 158 and removing the signal at the NOT logic circuit 156. Consequently, a signal now appears on line 161 with a delayed signal appearing on line 148 as retarded by the time logic 162. The delayed signal on line 148 resets the flip-flop logic 127 and causes a signal to appear again on line 128, thus permitting the operation of the AND logic circuit 126. The programmed controller is now ready to accept and process another signal from line 123 upon depression of the trigger 84. The total time of the cutting and removing cycle may be from about one to two seconds.

Figure 12A:
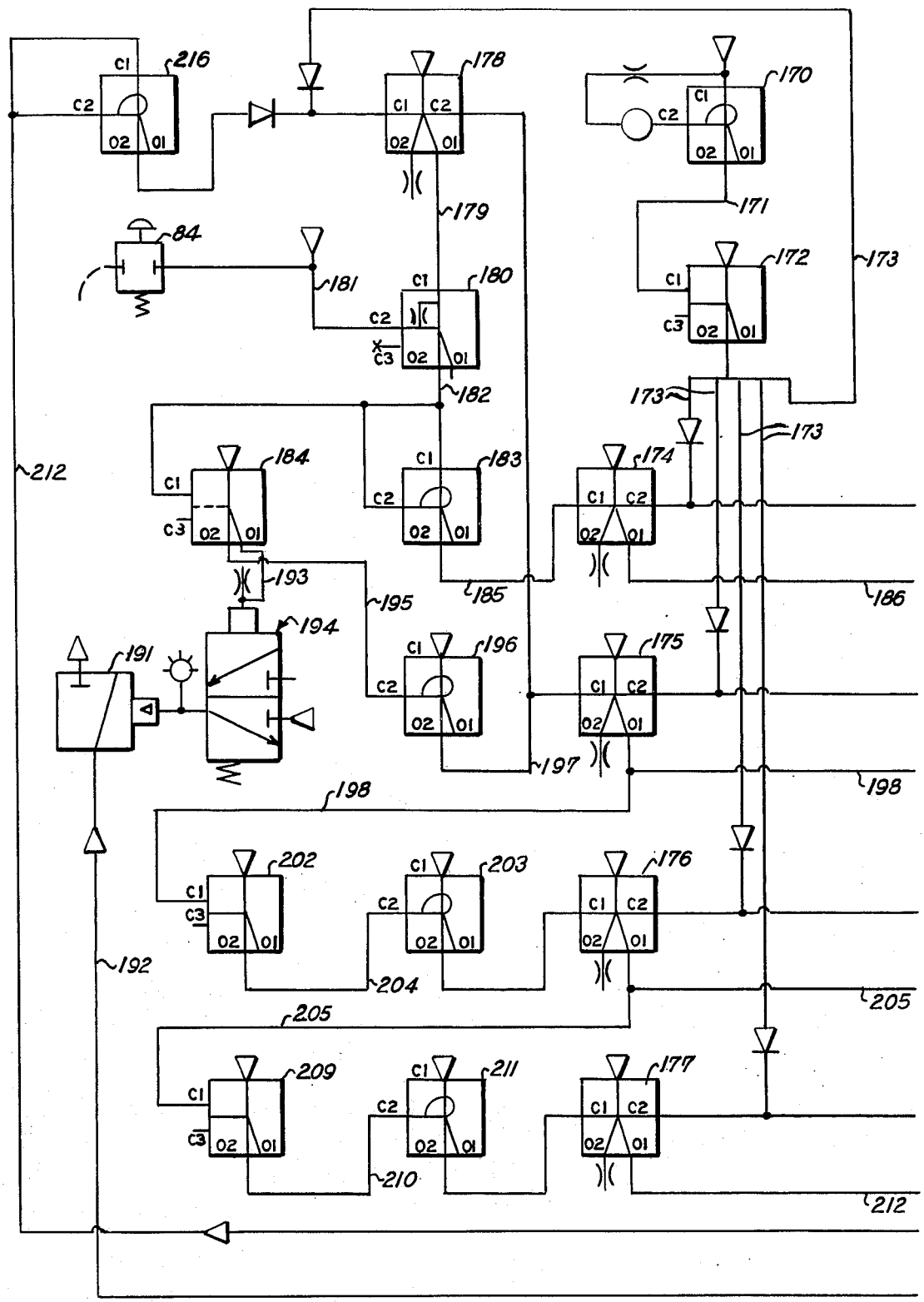
Figure 12B:
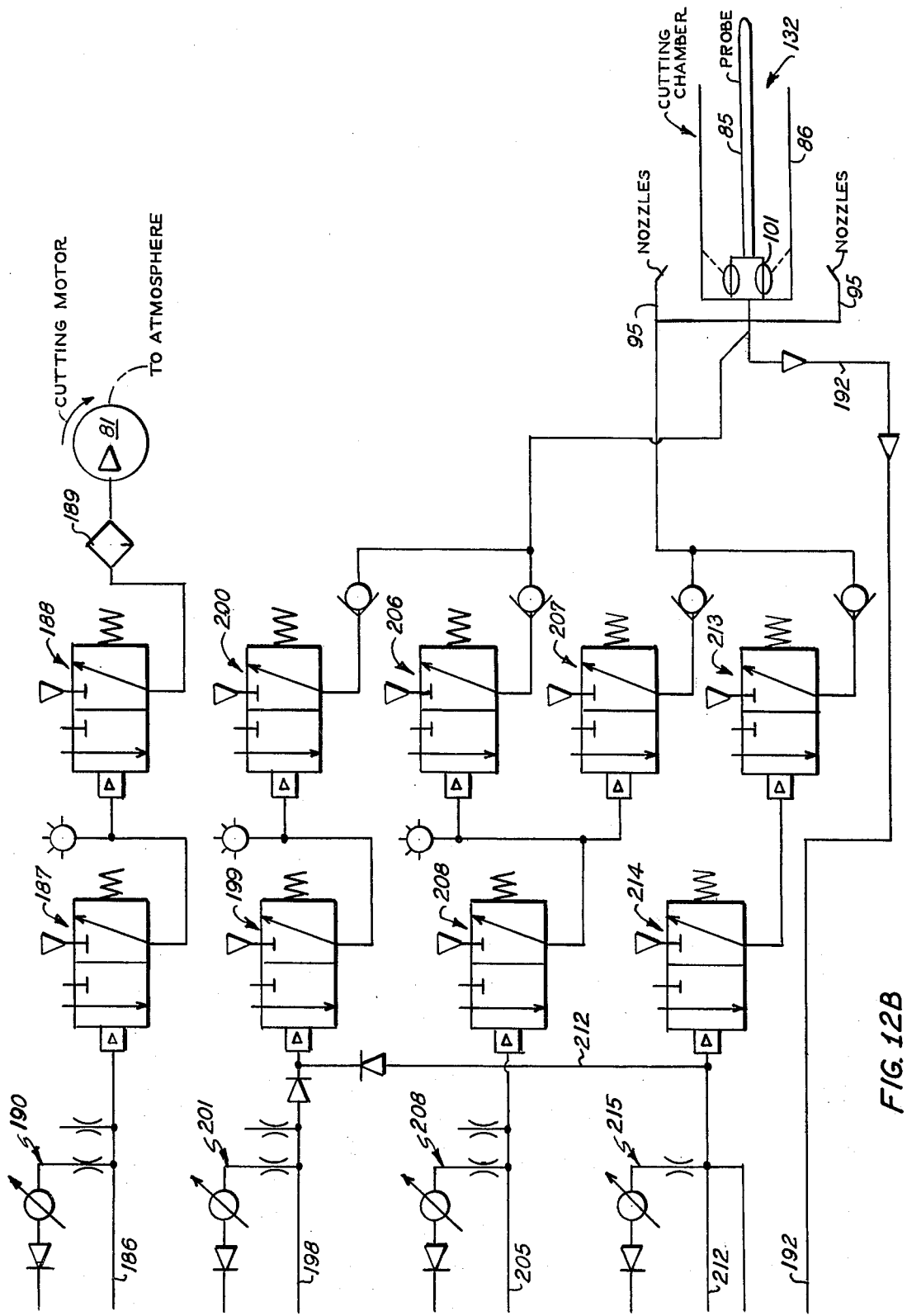

Another embodiment of an automatic control programmer is shown in FIG. 12. This schematic diagram shows a fluidic programmer which differs from the air logistics program as shown in FIG. 11 in that there are no moving parts within the control system. The triangle at the top of each of the fluidic logic elements represents a constant air supply to those elements. Each of the fluidic logic elements shown in the diagram are merely switches which are used to activate the various valves and time sequencers as discussed hereinbelow. It is understood that the one-shot fluidic valve may be constructed of one or two different elements as desired by the skilled artisan. Each of the triangles having a line under it is a symbol for a one way valve in the system.

The fluidic program provides an air impulse through the use of a constant air supply that is switched on and off as discussed hereinbelow. On the other hand, the air logistics system works with valves that are hydraulically operated so that they will provide fluid signals directly to air, water, and vacuum valves. A larger signal is used in the air logistics system than in the fluidic program. Consequently, there is a need for interface valves in the fluidic programming system to boost the signal received from the fluidic logic switch or device by an amount sufficient to active the air, water or vacuum valves.

More specifically referring to FIG. 12, the compressed air source and vacuum source are turned on to establish the level of vacuum and compressed air for the system. A vacuum is pulled in the cutting chamber between the cutting member 86 and probe 85 which is connected to the vacuum source 191 through vacuum line 192. The vacuum source is activated when the OR-NOR logic element 184 receives a signal at port C1 causing an output at port 01 through line 193 where the signal is boosted by the interface valve 194. The following cutting cycle is actuated while the vacuum exists within the cutting chamber 132.

The one-shot fluid logic element 170 supplies a momentary signal on line 171 placing a compressed air signal on the OR-NOR fluid logic element 172. Consequently, a compressed air signal is sent to all of the flip-flop elements 174, 175, 176, 177, and 178 via line 173. The system is now in the proper mode of operation.

Fluid logic 178 has an air signal at input C1 and output port 01 causing a compressed air supply on line 179 applied to input C1 of the key fluid logic element 180. In operation of the device as shown in FIG. 4, the trigger 84 is depressed thus bleeding line 181 to the atmosphere. Consequently, the compressed air supply from key element 180 is switched to output port 02 thus loading the air supply line 182.

As a result of the load on the line 182, the one-shot element 183 and OR-NOR element 184 have air supplies at their inputs C1. One-shot element 183 causes a momentary signal to appear on line 185 thereby causing the flip-flop element 174 to shift from output port 02 to the port 01 effectuating an air supply on line 186. The air supply on line 186 is amplified or boosted by the interface valve 187 which provides a signal for activating the air valve 188. The air supply is then directed to the cutting motor 81 through the lubricator 189 for rotating the cutting blade 86. The time sequencer 190 receives a signal from line 186 and produces a time delayed or adjusted signal to port C2 of the flip-flop 174. That is, after a certain time delay, the output of flip-flop 174 shifts from port 01 to port 02 thus turning off the cutting motor 81. The period of time that the cutting motor 81 operates is controlled by the operation of the timer sequence 190.

A brief delay exists between the time that the vacuum is pulled within the cutting chamber and the rotation of the cutting member 86 by the cutting motor 81. This delay is for a period of time that it takes for the flip-flop 174 to operate and effectuate the shift from ports 02 to 01. This is enough time for the interface valve 194 to activate the vacuum source 191 instantaneously on the vacuum line 192 so that the cutting operation does not begin prematurely. It is noted that before trigger 84 is depressed, the probe 85 is thrust through the vent opening of the carcass and into the alimentary canal so that the cutting edge of the blade 86 is touching the carcass. At this point, the trigger 84 is depressed and the program as discussed herein is started.

After the cut has been made, the vent is extended out of the carcass along with the alimentary canal for a length that is sufficient to meet the requirements established by the United States Department of Agriculture. This is accomplished by removing the tool away from the carcass while the vacuum is maintained by the depressed trigger 84. These regulations require that the distance be a minimum of four inches.

Once the vent and the alimentary canal have been removed from the carcass, the trigger 84 is released and pressure again builds up in line 181 causing the output of key element 180 to shift back to port 01 thus removing the signal on line 182. Consequently, the air signal of OR-NOR element 184 shifts to output port 02 sending a signal on line 195 to activate the one-shot element 196. The momentary impulse from element 196 is applied to input C2 of flip-flop 178 and input C1 of flip-flop 175 via the line 197. As a result, flip-flop 178 shifts from output port 01 to port 02 thereby removing the air signal from line 179. At the same time, the flip-flop 175 shifts its air from output port 02 to port 01 and causes an air signal to be placed on line 198.

The air signal line 198 is divided into two sections. The first section goes to the air valve 200 via the interface valve 199 to effectuate the first blowing operation through the opening 101. This ejects the vent from the cutting chamber after it has been removed from the carcass. The time sequencer 201 sends a delayed time signal back to input C2 of flip-flop 175 to terminate the first air blowing operation.

The second section of air supply line 198 applies a signal at input C1 of the OR-NOR element 202 which in turn activates one-shot element 203 and flip-flop 176 via line 204. Upon the shifting of the signal to port 01 of flip-flop 176, an air supply is provided on air line 205. Thus, a signal is given simultaneously to water valves 206 and 207 by way of the interface valve 208. A short pulse of water is injected into the water lines of the cutting tool. That is, in this particular instance, the water is not forced through the nozzles 95 or the opening 101. The time sequencer 208 sends a delayed signal back to flip-flop 176 to stop the water injection cycle.

While the signal appears on line 205, the output of the OR-NOR element is maintained at port 01. When the signal is depleted on line 205 upon the switching of flip-flop 176, an air supply is produced on line 210 which produces an impulse to flip-flop 177 via the one-shot element 211. Activation of flip-flop 177 provides a signal on line 212 which activates air valves 213 and 200 via interface valves 214 and 199, respectively. The air valve 213 forces the water injected into the canal 96 through the nozzles 95 onto the outside of the cutting member 86. The operation of the air valve 200 pushes the water injected into the canal or tube 103 through the openings 101 to wash the inside of the cutting chamber 132 and the probe member 85. The second air blowing step is continued for a time determined by the timer sequence 215 which allows the air to continue for a length of time long enough to blow away any excess water on the cutting member 86 or probe member 85.

At the same time that the second air blow is initiated, a signal is sent via air line 212 to the one-shot element 216 as shown. A short impulse is provided by the one-shot element 216 to the input C1 of the flip-flop 178 thus shifting from output port 02 to port 01 again loading the key element 180 by way of the air line 179. The system is again in condition for another cycle. The key element 180 is not activated until the trigger 84 is again pressed by the operator.

The number of carcasses that may be processed is dependent upon the efficiency of the operator. It is possible to complete the total cycle in about one to two seconds as described herein and above. Therefore, the time lapse of the time sequencers is a matter of milliseconds. The sequence of the wash and blow step can be placed in any desired order. Additionally, the amount of time spent in each one of the steps can be altered as desired.

While the method and apparatus for eviscerating poultry and the like has been shown and described in detail, it is obvious that this invention is not to be considered as being limited to the exact form disclosed, and that changes in detail and construction may be made therein within the scope of the invention, without departing from the spirit thereof.

The embodiments of the invention in which an exclusive property or privelege is claimed are defined as follows:

1. A system for dressing poultry, animals and the like, comprising:
   a. at least one dressing tool having a rotatable circular cutting blade means and a structural configuration effective to be held in the hand of an operator for removing the alimentary canal and anus from a carcass,
   b. a compressed air source and a vacuum source and means connecting said dressing tool to said sources,
   c. said dressing tool including an elongated probe means coaxially disposed within said rotatable cutting blade means so that a cutting chamber is defined by the space between the probe means and the rotatable cutting blade means,
   d. means for rotating the cutting blade means, and
   e. automatic programmed control means for drawing a vacuum on the cutting vacuum chamber at the same time that the cutting blade means is being rotated,
   f. a single trigger movable between a depressed and released position for activating said programmed control means,
   g. said dressing tool being connected to each of the compressed air and vacuum sources for a time period while the trigger is in the depressed position and being connected to the atmosphere when the trigger is in the released position immediately after having been depressed,
   h. said programmed control means including an air fluidic mechanism having valves disposed at a location away from the dressing tool between said dressing tool and said compressed air and vacuum sources for controlling the flow of compressed air and vacuum during a working cycle of the dressing tool.

2. A system for dressing poultry, animals and the like, comprising:
   a. at least one dressing tool having a rotatable circular cutting blade means and a structural configuration effective to be held in the hand of an operator for removing the alimentary canal and anus from a carcass,
   b. a compressed air source and a vacuum source and means connecting said dressing tool to said sources,
   c. said dressing tool including an elongated probe means fixedly disposed with respect to the dressing tool and coaxially located within said rotatable cutting blade means so that a cutting chamber is defined by the space between the probe means and the rotatable cutting blade means,
   d. means for rotating the cutting blade means, and
   e. automatic programmed control means apart from the dressing tool for drawing a vacuum on the cutting vacuum chamber at the same time that the cutting blade means is being rotated,
   f. said elongated probe means including a limiting means disposed a fixed distance from the end of the probe means within said circular cutting blade means.

3. A system as defined in claim 2, wherein said limiting means comprises a member having openings through which air flow may be effected.

4. A system for dressing poultry, animals and the like, comprising:
   a. at least one dressing tool having a rotatable circular cutting blade means and a structural configuration effective to be held in the hand of an operator for removing the alimentary canal and anus from a carcass,
   b. a compressed air source, a vacuum source and at least one fluid source and means connecting said dressing tool to said sources,
   c. said dressing tool including an elongated probe means coaxially disposed within said rotatable cutting blade means so that a cutting chamber is defined by the space between the probe means and the rotatable cutting blade means,
   d. means for rotating the cutting blade means from said compressed air source,
   e. said dressing tool including a nozzle means disposed outside the cutting blade means for directing a flow of washing fluid from said fluid source toward the cutting blade means for washing same after effectuating a cutting operation, and
   f. automatic programmed control means apart from the dressing tool for timing a flow of washing fluid on the cutting blade means,
   g. said programmed control means including means for drawing a vacuum on the cutting vacuum chamber at the same time that the cutting blade means is being rotated.

5. A system for dressing poultry, animals and the like, comprising:
   a. at least one dressing tool having a rotatable circular cutting blade means and a structural configuration effective to be held in the hand of an operator for removing the alimentary canal and anus from a carcass,
   b. a compressed air source, a vacuum source and at least one fluid source and means connecting said dressing tool to said sources,
   c. said dressing tool including an elongated probe means fixedly disposed with respect to the dressing tool and coaxially located within said rotatable cutting blade means so that a cutting chamber is defined by the space between the probe means and the rotatable cutting blade means, and
   d. automatic programmed control means apart from the dressing tool for timing a flow of washing fluid on the cutting blade means after the dressing tool has been used to remove the alimentary canal and anus from a carcass,
   e. said programmed means including means for drawing a vacuum on the cutting vacuum chamber at the same time that the cutting blade means is being rotated.

6. A system as defined in claim 5 wherein said elongated probe means includes a limiting means disposed a fixed distance from the end of the probe means within said circular cutting blade means.

7. A system as defined in claim 6 wherein said limiting means comprises a member having openings through which fluid flow may be effected.

8. A system for dressing poultry, animals and the like, comprising:
   a. at least one dressing tool having a rotatable circular cutting blade means and a structural configuration effective to be held in the hand of an operator for removing the alimentary canal and anus from a carcass,
   b. a compressed air source, a vacuum source and at least one fluid source and means connecting said dressing tool to said sources,
   c. said dressing tool including an elongated probe means coaxially disposed within said rotatable cutting blade means so that a cutting chamber is defined by the space between the probe means and the rotatable cutting blade means,
   d. means for rotating the cutting blade means, and
   e. automatic programmed control means apart from the dressing tool for timing a flow of washing fluid on the cutting blade means after the dressing tool has been used to remove the alimentary canal and anus from a carcass,
   f. said programmed control means including means for drawing a vacuum on the cutting chamber at the same time that the cutting blade means is being rotated, means for effecting a water wash of said cutting blade means and means for effecting an air blow towards said cutting blade means.

9. A system for dressing poultry, animals and the like, comprising:
   a. at least one dressing tool having a rotatable circular cutting blade means and a structural configuration effective to be held in the hand of an operator for removing the alimentary canal and anus from a carcass,
   b. a compressed air source, a vacuum source and at least one fluid source and means connecting said dressing tool to said sources,
   c. said dressing tool including an elongated probe means coaxially disposed within said rotatable cutting blade means so that a cutting chamber is defined by the space between the probe means and the rotatable cutting blade means,
   d. means for rotating the cutting blade means, e. automatic programmed control means apart from said dressing tool for timing a flow of washing fluid on the cutting blade means after the dressing tool has been used to remove the alimentary canal and anus from a carcass, f. said programmed control means including means for drawing a vacuum on the cutting vacuum chamber at the same time that the cutting blade means is being rotated, and g. a single trigger movable between a depressed and released position for activating said programmed control means, h. said dressing tool being connected to each of the compressed air and vacuum sources for a measured time period while the trigger is in the depressed position and is connected to the fluid source while the trigger is in the released position immediately after having been depressed.

10. A system for dressing poultry, animals and the like, comprising:

a. at least one dressing tool having a rotatable circular cutting blade means and a structural configuration effective to be held in the hand of an operator for removing the alimentary canal and anus from a carcass, b. a compressed air source, a vacuum source and at least one fluid source and means connecting said dressing tool to said sources, c. said dressing tool including an elongated probe means coaxially disposed within said rotatable cutting blade means so that a cutting chamber is defined by the space between the probe means and the rotatable cutting blade means, d. means for rotating the cutting blade means, and e. automatic programmed control means for timing a flow of washing fluid on the cutting blade means after the dressing tool has been used to remove the alimentary canal and anus from a carcass, f. said programmed control means including means for drawing a vacuum on the cutting vacuum chamber at the same time that the cutting blade means is being rotated, g. said programmed control means further including an air logistics control mechanism having valves disposed at a location away from the dressing tool between said dressing tool and said compressed air and vacuum sources for controlling the flow of compressed air and vacuum during a working cycle of the dressing tool.

11. A system as defined in claim 10 wherein said air logistics control mechanism includes a vacuum valve for connecting the cutting vacuum chamber to a vacuum source, a NOT logic circuit to control said vacuum valve and an actuating means for energizing said NOT circuit at a desired time.

12. A system as defined in claim 10 wherein said rotating means includes an air driven motor operatively connected to said rotatable cutting blade means, said air logistics control mechanism includes a normally closed air valve disposed between a compressed air source and the air driven motor, and means for opening said closed air valve to operate said cutting blade means, said valve means opening means includes an AND logic circuit, timing circuit means connected to the output of said AND logic circuit, and an air valve actuatable by drawing a vacuum thereon being connected to the input of said AND logic circuit, said AND logic circuit being additionally connected to a supply air line whereby an output signal is generated to said timing circuit means when a vacuum is drawn on said air valve.

13. A system as defined in claim 12 wherein said fluid source is a water source that is operatively connected to flow through said dressing tool to clean the cutting blade means and elongated probe means after the alimentary canal and anus have been separated from the poultry carcass.

14. A system for dressing poultry, animals and the like, comprising:

a. at least one dressing tool having a rotatable circular cutting blade means and a structural configuration effective to be held in the hand of an operator for removing the alimentary canal and anus from a carcass, b. a compressed air source, a vacuum source and at least one fluid source and means connecting said dressing tool to said sources, c. said dressing tool including an elongated probe means coaxially disposed within said rotatable cutting blades means so that a cutting chamber is defined by the space between the probe means and the rotatable cutting blade means, d. means for rotating the cutting blade means, and e. automatic programmed control means for timing a flow of washing fluid on the cutting blade means after the dressing tool has been used to remove the alimentary canal and anus from a carcass, f. said programmed control means including means for drawing a vacuum on the cutting vacuum chamber at the same time that the cutting blade means is being rotated, g. said programmed control means including an air fluidic control mechanism having valves located away from the dressing tool between the dressing tool and the compressed air and vacuum during working cycle of the dressing tool.

15. A system as defined in claim 14 wherein said fluidic control mechanism includes a plurality of fluid logic elements each of which is adapted to operate said connecting means to said air, vacuum and fluid sources, means providing an air supply, and means for actuating said fluid logic elements from said air supply.

* * * * *